2,880,256
2-ALLYL, 4-ALKOXY PHENOL NATURAL RUBBER STABILIZERS

Geoffrey S. Davy and Gwyn E. Williams, Manchester, England, assignors to Imperial Chemical Industries Limited, London, England, a corporation of Great Britain No Drawing. Application March 28, 1955
Serial No. 497,406

Claims priority, application Great Britain April 9, 1954

6 Claims. (Cl. 260—810)

This invention relates to improvements in the manufacture of age-resistant natural and synthetic rubbers and rubber articles.

We have found that 2-allylphenols carrying in the 4 position an alkoxy substitutent with not more than 12 carbon atoms are very valuable antioxidants for natural and syntheic rubbers.

More particularly we have found that they have excellent non-staining and anti-flex cracking properties. They are of especial value for white sidewalls for tyres.

The allyl alkoxyphenols may be made according to the processes described for the methoxy and ethoxy derivatives in J. Prakt. Chem., 1921, 102, 44, and J. Amer. Chem. Soc., 1944, 66, 1077, respectively. The corresponding isopropyloxy, n-butyloxy-, $\gamma\epsilon\epsilon$-trimethylhexyloxy- and n-dodecyloxy-derivatives may be mentioned as other specific compounds which are included in those which may be used in this invention.

The antioxidants are employed in the manufacture of rubber and rubber articles according to the usual methods. Thus they may for example be mixed with the rubber along with vulcanising and other ingredients and the resulting mixes then cured by heat treatment, or they may be mixed with rubber along with other compounding ingredients and the mixture vulcanised by treatment with sulphur monochloride in the cold. The antioxidants are effective in proportions of from about ¼ to 2 percent of the weight of the rubber.

The synthetic rubbers which may be used include for example polymers of butadiene-1:3, isobutene and 2-chlorobutadiene-1:3 and copolymers of these compounds with acrylonitrile, styrene, methyl methacrylate and other well known polymerisable compounds which are used in the manufacture of these rubbers.

The following examples in which parts are by weight illustrate but do not limit the invention.

EXAMPLE 1

Vulcanisable rubber stocks of the following compositions were prepared by the usual process of mixing, using 2-allyl-4-methoxyphenol as antioxidant and also using no antioxidant.

| Mix | A | B |
|---|---|---|
| Pale crepe natural rubber | 100 | 100 |
| Zinc oxide | 10 | 10 |
| Blanc fixe | 75 | 75 |
| Stearic acid | 1 | 1 |
| Sulphur | 3 | 3 |
| Diphenylguanidine | 0.5 | 0.5 |
| 2-Allyl-4-methoxyphenol | 1 | |

Sheets of each mix were cured for 75 minutes at 141° C. and ageing tests carried out on the vulcanisates.

The results of the ageing tests were as follows:

Mix A

| | Tensile strength (kg./cm.$^2$) | Elongation at break (percent) |
|---|---|---|
| Unaged | 144 | 637 |
| Aged in oxygen bomb at 70° C. and 300 p.s.i. pressure for 8 days | 38 | 496 |

Mix B

This perished in about 2 days in the oxygen bomb ageing test.

EXAMPLE 2

Vulcanisable rubber stocks of the following compositions were prepared by the usual process of mixing, using 2-allyl-4-methoxyphenol as antioxidant and also using no antioxidant.

| Mix | A | B |
|---|---|---|
| Smoked sheet natural rubber | 100 | 100 |
| Zinc oxide | 5 | 5 |
| Carbon black | 47.5 | 47.5 |
| Stearic acid | 3 | 3 |
| Sulphur | 3 | 3 |
| Mercaptobenzthiazole | 0.85 | 0.85 |
| 2-Allyl-4-methoxyphenol | 1 | 0 |

Sheets of each mix were cured for 45 minutes at 141° C.

Test pieces were moulded and submitted to a standard test for determining resistance to flex cracking; the number of flexures to give standard degrees of cracking were as follows:

| | Mix A | Mix B |
|---|---|---|
| | Flexures×10$^{-3}$ | |
| Pin holes | 63 | 9 |
| Small cracks | 150 | 18 |
| Medium cracks | 265 | 27 |
| Deep cracks | 340 | 31.5 |

EXAMPLE 3

Vulcanisable rubber stocks of the following compositions were prepared by the usual process of mixing, using 2-allyl-4-methoxyphenol as antioxidant and also using no antioxidant.

| Mix | A | B |
|---|---|---|
| Pale crepe natural rubber | 100 | 100 |
| Zinc oxide | 5 | 5 |
| Titanium dioxide | 50 | 50 |
| Activated calcium carbonate | 35 | 35 |
| Aluminium silicate | 25 | 25 |
| Stearic acid | 0.25 | 0.25 |
| Petroleum jelly | 1.0 | 1.0 |
| Sulphur | 2.5 | 2.5 |
| Mercaptobenzthiazole | 0.75 | 0.75 |
| 2-Allyl-4-methoxyphenol | 1 | |

Sheets of each mix were cured for 30 minutes at 141° C.

Flexing tests were then carried out as in the previous example with the following results.

| | Mix A | Mix B |
|---|---|---|
| | Flexures×10$^{-3}$ | |
| Pin holes | 13 | 3.75 |
| Small cracks | 31 | 7.5 |
| Medium cracks | 48 | 10.3 |
| Deep cracks | 59 | 12 |

EXAMPLE 4

To show the non-staining properties of the antioxidants, vulcanisable rubber stocks of the following compositions were prepared by the usual process of mixing, using 2-allyl-4-methoxyphenol and also no antioxidant.

| Mix | A | B |
|---|---|---|
| Pale crepe natural rubber | 100 | 100 |
| Zinc oxide | 10 | 10 |
| Blanc fixe | 75 | 75 |
| Stearic acid | 1 | 1 |
| Titanium dioxide | 10 | 10 |
| Sulphur | 2 | 2 |
| Zinc diethyldithiocarbamate | 0.375 | 0.375 |
| 2-Allyl-4-methoxyphenol | 1 | |

A sheet of each mix was cured for 12 minutes at 125° C. Samples of the vulcanised sheets were exposed to ultra violet light with the following results:

| | Mix A | Mix B |
|---|---|---|
| Appearance after exposure for 8 hours | Equal to blank test. | Cream. |
| Appearance after exposure for 16 hours | ___do___ | Deep cream. |

EXAMPLE 5

Vulcanisable rubber stocks of the following compositions were prepared by the usual process of mixing, using 2-allyl-4-ethoxyphenol and 2-allyl-4-dodecyloxyphenol as antioxidants and also using no antioxidant.

| Mix | A | B | C |
|---|---|---|---|
| Pale crepe natural rubber | 100 | 100 | 100 |
| Zinc oxide | 5 | 5 | 5 |
| Titanium dioxide | 50 | 50 | 50 |
| Activated calcium carbonate | 35 | 35 | 35 |
| Aluminum silicate | 25 | 25 | 25 |
| Stearic acid | 0.25 | 0.25 | 0.25 |
| Petroleum jelly | 1.0 | 1.0 | 1.0 |
| Sulphur | 2.5 | 2.5 | 2.5 |
| Mercaptobenzthiazole | 0.75 | 0.75 | 0.75 |
| 2-Allyl-4-ethoxyphenol | 1 | | |
| 2-Allyl-4-dodecyloxyphenol | | 1 | |

Sheets of each mix were cured for 30 minutes at 141° C.

Flexing tests were then carried out as in Example 2 with the following results:

| | Mix A | Mix B | Mix C |
|---|---|---|---|
| | Flexures×10⁻³ | | |
| Pin holes | 13.5 | 12 | 6 |
| Small cracks | 22.5 | 22.5 | 12 |
| Medium cracks | 46 | 40.5 | 17 |
| Deep cracks | 54 | 49.5 | 21 |

EXAMPLE 6

Vulcanisable rubber stocks of the following compositions were prepared by the usual process of mixing, using 2-allyl-4-methoxyphenol, 2-allyl-4-ethoxyphenol and 2-allyl-4-dodecyloxyphenol as antioxidants and also using no antioxidant.

| Mix | A | B | C | D |
|---|---|---|---|---|
| Smoked sheet natural rubber | 100 | 100 | 100 | 100 |
| Zinc oxide | 5 | 5 | 5 | 5 |
| Carbon black | 47.5 | 47.5 | 47.5 | 47.5 |
| Stearic acid | 3 | 3 | 3 | 3 |
| Sulphur | 3 | 3 | 3 | 3 |
| Mercaptobenzthiazole | 0.85 | 0.85 | 0.85 | 0.85 |
| 2-Allyl-4-methoxyphenol | 1 | | | |
| 2-Allyl-4-ethoxyphenol | | 1 | | |
| 2-Allyl-4-dodecyloxyphenol | | | 1 | |

Sheets of each mix were cured for 45 minutes at 141° C.

Flexing tests were then carried out as in Example 2 with the following results.

| | Mix A | Mix B | Mix C | Mix D |
|---|---|---|---|---|
| | Flexures×10⁻³ | | | |
| Pin Holes | 49.5 | 36 | 45 | 18 |
| Small cracks | 108 | 153 | 112 | 27 |
| Medium cracks | 212 | 315 | 216 | 40.5 |
| Deep cracks | 333 | 415 | 297 | 54 |

EXAMPLE 7

Vulcanisable rubber stocks of the following compositions were prepared by the usual process of mixing, using 2-allyl-4-ethoxyphenol and 2-allyl-4-dodecyloxyphenol as antioxidants and also using no antioxidant.

| Mix | A | B | C | D |
|---|---|---|---|---|
| Pale crepe natural rubber | 100 | 100 | 100 | 100 |
| Zinc oxide | 10 | 10 | 10 | 10 |
| Blanc fixe | 75 | 75 | 75 | 75 |
| Stearic acid | 1 | 1 | 1 | 1 |
| Sulphur | 3 | 3 | 3 | 3 |
| Diphenylguanidine | 0.5 | 0.5 | 0.5 | 0.5 |
| 2-Allyl-4-methoxyphenol | 1 | | | |
| 2-Allyl-4-ethoxyphenol | | 1 | | |
| 2-Allyl-4-dodecyloxyphenol | | | 1 | |

Sheets of each mix were cured for 75 minutes at 141° C. and ageing tests carried out on the vulcanisates.

The results of the ageing tests were as follows:

| | Tensile strength (kg./sq. cm.) | | | |
|---|---|---|---|---|
| | A | B | C | D |
| Unaged | 164 | 179 | 164 | 177 |
| Aged in oxygen bomb at 70° C. and 300 p.s.i. pressure: | | | | |
| (i) for 8 days | 58 | 69 | 68 | Perished. |
| (ii) for 12 days | 32 | 40 | 39 | Perished. |
| (iii) for 16 days | 35 | 42 | 46 | Perished. |

EXAMPLE 8

Mix and cure as in Example 1.

2-allyl-4-n-butoxyphenol is compared with 2-allyl-4-methoxyphenol the properties of which have already been illustrated.

| Antioxidants | Mix A | Mix B |
|---|---|---|
| 2-Allyl-4-methoxyphenol | 1 | |
| 2-Allyl-4-n-butoxyphenol | | 1 |

| | Tensile strength (kg./sq. cm.) | |
|---|---|---|
| | Mix A | Mix B |
| Unaged | 165 | 161 |
| Aged in oxygen bomb at 70° C. and 300 p.s.i. pressure: | | |
| (i) for 8 days | 60 | 66 |
| (ii) for 12 days | 31 | 38 |
| (iii) for 16 days | 21 | 32 |

EXAMPLE 9

Mix and cure as in Example 2.

| Antioxidants | Mix A | Mix B |
|---|---|---|
| 2-Allyl-4-methoxyphenol | 1 | |
| 2-Allyl-4-n-butoxyphenol | | 1 |

| | Flexures×10⁻³ | |
|---|---|---|
| Stages of cracking: | | |
| Pin holes | 40.5 | 58 |
| Small cracks | 90 | 144 |
| Medium cracks | 234 | 297 |
| Deep cracks | 300 | 390 |

EXAMPLE 10

Mix and cure as in Example 3.

| Antioxidants | Mix A | Mix B |
|---|---|---|
| 2-Allyl-4-methoxyphenol | 1 | |
| 2-Allyl-4-butoxyphenol | | 1 |
| | Flexures×10⁻³ ||
| Stages of cracking: | | |
| Pin holes | 18 | 12 |
| Small cracks | 48 | 30 |
| Medium cracks | 72 | 36 |
| Deep cracks | 88 | 45 |

EXAMPLE 11

*Comparison of 2-allyl-4-methoxyphenol with 4:4'-dimethoxy-diphenylamine.*—Using the same mix and cure as Example 3 except for the antioxidant, 4:4'-dimethoxy diphenylamine is an antioxidant which is well-known to possess outstanding anti-flex cracking properties.

| Antioxidants | Mix A | Mix B | Mix C |
|---|---|---|---|
| 2-Allyl-4-methoxyphenol | 1 | | |
| 4:4'-Dimethoxy-diphenylamine | | 1 | |
| | Flexures×10⁻³ |||
| Pin holes | 14 | 9 | 3.75 |
| Small cracks | 23 | 13.5 | 7.5 |
| Medium cracks | 41 | 20 | 11 |
| Deep cracks | 55 | 27 | 14 |

These results show the superiority of the new antioxidant.

What we claim is:

1. A composition comprising a rubbery polymer of natural rubber, and having incorporated in said polymer at least from 0.25 to 2% by weight of said polymer a compound having the formula

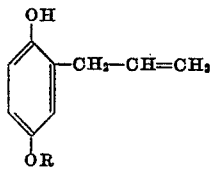

wherein R is an alkyl group having less than 12 carbon atoms.

2. The composition of claim 1 wherein said rubbery polymer is in the form of a rubber latex.
3. Composition as claimed in claim 1, wherein the antioxidant is 2-allyl-4-methoxyphenol.
4. Composition as claimed in claim 1, wherein the antioxidant is 2-allyl-4-ethoxyphenol.
5. Composition as claimed in claim 1, wherein the antioxidant is 2-allyl-4-n-butoxyphenol.
6. Composition as claimed in claim 1, wherein the antioxidant is 2-allyl-4-n-dodecyloxyphenol.

References Cited in the file of this patent

UNITED STATES PATENTS

| | | |
|---|---|---|
| 2,378,698 | Gibbs | June 19, 1945 |
| 2,632,751 | Anderson | Mar. 24, 1953 |
| 2,682,474 | Bell et al. | June 29, 1954 |